United States Patent
Jiang et al.

(10) Patent No.: US 10,416,032 B2
(45) Date of Patent: Sep. 17, 2019

(54) OPTICAL FIBER DETECTION DEVICE WITH STEEL RAIL AS ELASTOMER AND RAILWAY OVERLOAD AND UNBALANCED LOAD DETECTION SYSTEM

(71) Applicant: BEIJING ORIENTAL RAILWAY TECHNOLOGY DEVELOPMENT CO., LTD, Beijing (CN)

(72) Inventors: Ying Jiang, Beijing (CN); Xiangsheng Pang, Beijing (CN); Xiaobing Liu, Beijing (CN); Chao Guo, Beijing (CN); Zhiqiang Wang, Beijing (CN)

(73) Assignee: BEIJING ORIENTAL RAILWAY TECHNOLOGY DEVELOPMENT CO., LTD, Beijing (CN)

( * ) Notice: Subject to any disclaimer, the term of this patent is extended or adjusted under 35 U.S.C. 154(b) by 385 days.

(21) Appl. No.: 15/399,733

(22) Filed: Jan. 5, 2017

(65) Prior Publication Data
US 2017/0138805 A1    May 18, 2017

Related U.S. Application Data
(63) Continuation of application No. PCT/CN2015/094627, filed on Nov. 14, 2015.

(51) Int. Cl.
*G01M 5/00* (2006.01)
*G01L 1/24* (2006.01)
*B61L 23/04* (2006.01)
*B61L 27/00* (2006.01)

(52) U.S. Cl.
CPC ............ *G01L 1/242* (2013.01); *B61L 23/047* (2013.01); *B61L 27/0088* (2013.01); *G01M 5/0025* (2013.01); *G01M 5/0041* (2013.01); *G01M 5/0058* (2013.01); *G01M 5/0091* (2013.01)

(58) Field of Classification Search
CPC .......... B64C 13/28; B64C 13/50; G01L 1/042; G01L 1/122
USPC .......................................................... 73/802
See application file for complete search history.

(56) References Cited

U.S. PATENT DOCUMENTS

| | | | |
|---|---|---|---|
| 5,330,136 A * | 7/1994 | Colbaugh | B61L 1/06 246/122 R |
| 5,529,267 A | 6/1996 | Giras | |
| 2006/0022063 A1* | 2/2006 | Tsai | B61L 29/24 238/8 |

(Continued)

FOREIGN PATENT DOCUMENTS

| | | |
|---|---|---|
| CN | 1676389 A | 10/2005 |
| CN | 101376392 A | 3/2009 |
| CN | 101571432 A | 11/2009 |

(Continued)

OTHER PUBLICATIONS

Search report of PCT/CN2015/094627.

*Primary Examiner* — Max H Noori
(74) *Attorney, Agent, or Firm* — Wayne & Ken, LLC; Tony Hom

(57) ABSTRACT

An optical fiber detection device with a steel rail as an elastomer and a railway overload and unbalanced load detection system. The optical fiber detection device includes a shear force detection device, the shear force detection device includes an optical fiber sensitive element which is fixed on a neutral axis of the steel rail through low-energy spot welding.

5 Claims, 21 Drawing Sheets

(56) References Cited

U.S. PATENT DOCUMENTS

2006/0214068 A1\* 9/2006 Tsai ..................... B61L 5/107
  246/435 R
2016/0356661 A1\* 12/2016 Glueck ................. B61K 9/08

FOREIGN PATENT DOCUMENTS

| CN | 104880274 A | 9/2015 |
|----|-------------|--------|
| CN | 105444853 A | 3/2016 |
| DE | 102014100653 A1 | 7/2015 |

\* cited by examiner

OPTICAL FIBER DETECTION DEVICE WITH STEEL RAIL AS ELASTOMER AND RAILWAY OVERLOAD AND UNBALANCED LOAD DETECTION SYSTEM

CROSS-REFERENCE TO RELATED APPLICATIONS

This application is a continuation of International Patent Application No. PCT/CN2015/094627 with a filing date of Nov. 14, 2015, designating the United States. The content of the aforementioned application, including any intervening amendments thereto, are incorporated herein by reference.

TECHNICAL FIELD

The invention relates to an optical fiber detection device, more particularly, to an optical fiber detection device which directly adopts a steel rail as an elastomer and is applied to railway overload and unbalanced load detection.

BACKGROUND OF THE PRESENT INVENTION

A railway overload and unbalanced load detection device is an equipment which automatically carries out continuous and dynamic metering and vehicle identification on a moving train without parking or unhooking. Overload and unbalanced load detection equipment used on a railway in China generally utilizes a pressure sensor to serve as a primary instrument for weighing and metering and takes a shear force sensor as an axle counting primary instrument for carrying out vehicle identification. For the railway overload and unbalanced load equipment, having requirement on absolute accuracy of the shear force sensor arranged on a steel rail, a traditional steel rail shear force sensor 9 (FIG. 2) is configured by gluing a strain gauge 10 (FIG. 1) in a conical elastic carrier, so that the traditional steel rail shear force sensor n be fastened by virtue of a bolt only by drilling a hole on a rail web 2 of the steel rail and can sense stress and deformation of the steel rail. A structural diagram and signal outputs of the traditional steel rail shear force sensor 9 are shown in FIGS. 1-5. Principle of an output circuit of the traditional steel rail shear force sensor 9 is shown in FIG. 3, a shear force waveform curve output by the traditional steel rail shear force sensor is shown in FIG. 5, by virtue of the detection mode, the obtained waveform curve meets detection analysis requirement of an overload and unbalanced load detection system, however, the traditional steel rail shear force sensor has insurmountable fatal defects due to the principle and structure thereof:

1. It is required to be drilled in the middle part of the rail web 2 of the steel rail, thereby reducing the rail strength, which is a present situation resolutely against by a railway works department and that needs to be accepted due to work demand and limitation by technical conditions;
2. Due to difference of the steel rail and the shear force sensor in expansion shrinkage coefficients of materials, difference in machining processes and bolt fastening degrees, and vibration influence caused by movement, the traditional shear force sensor 9 has unstable stress state;
3. Adhesive strain gauge 10 sealed form has the same processing technology, limited life, quality differences and higher price with the pressure sensor;
4. With the strain gauge 10 served as one arm of an electronic bridge, additional error factors are added to an output signal of the electronic bridge;
5. Analog output weakens the signal, which needs to be conditioned by subsequent equipment, and it is short in transmission distance and weak in anti-interference capability.

SUMMARY OF PRESENT INVENTION

Aiming at shortcomings of the prior art, the invention provides an optical fiber detection device with a steel rail as an elastomer, wherein the steel rail itself is provided as the elastomer, and an optical fiber sensitive element is provided as a detection device and is pasted on a rail web of a railway steel rail.

To achieve the above objects, the invention provides the following technical scheme: an optical fiber detection device with the steel rail as the elastomer comprises a shear force detection device and a pressure detection device, wherein the shear force detection device comprises an optical fiber sensitive element which is fixed on the rail web of the steel rail and passes through a neutral axis of the steel rail.

Further, the arrangement direction of the optical fiber sensing element is provided at an angle of 40-50 degrees with respect to the neutralization axis.

By adopting the technical scheme, the neutral axis is one position in special stress state on the steel rail, neither tensile stress nor compressive stress exists on the neutral axis of the steel rail, for the optical fiber sensitive element arranged at the position, the part thereof arranged between the neutral axis and a rail head is used for detecting the tensile stress, and the part thereof arranged between the neutral axis and a rail base is used for detecting the compressive stress, thereby replacing a technology comprising the steps of drilling a hole in the rail web and then combining a conical elastomer in the prior art, the steel rail itself is directly provided as a deformation elastic carrier, and shear force waveform of the steel rail can be obtained by utilizing deformation of the optical fiber sensitive element; besides, a position on the outer surface of the rail web is more convenient for polishing compared with a position at the bottom of the rail head and is less influenced by vibration, thereby being, beneficial to improving quality of the output shear force waveform.

The invention is further provided as: the shear force detection device internally comprises two optical fiber sensitive elements which are arranged on two opposite side surfaces of the rail web, are the same in distance from the rail base and respectively pass through the neutral axis of the steel rail.

By adopting the technical scheme, the installation form can make the optical fiber sensitive elements to be only sensitive to vertical shear force of the steel rail and insensitive to other interference factors such as stretching and rebound, so as to further improve the detection precision.

Further, the two optical fiber sensitive elements and the neutral axis of the steel rail are arranged in the same inclination direction along the direction with an included angle of 45 degrees.

By adopting the technical scheme, a wagon detected on the steel rail advances in a serpentine manner, so that the steel rail can be eccentric easily when wheels are pressed on the steel rail, at the moment, shear force waveforms output by the optical fiber sensitive elements can be influenced due to eccentricity of the steel rail, by virtue of complementary stresses of one pair of optical fiber sensitive elements arranged at positions same in distance from sleepers on the two side surfaces of the rail web, the shear force waveforms output by the two optical fiber sensitive elements form a complementary synthetic waveform, and output quality is guaranteed.

The invention is further arranged as: the shear force detection device internally comprises two optical fiber sensitive elements which are symmetrically arranged by providing the neutral axis of the steel rail as a symmetry axis, and the two optical fiber sensitive elements have an included angle of 90 degrees and are fixed at the same side of the rail web.

Further, the shear force detection device internally comprises four optical fiber sensitive elements which are grouped in pairs and oppositely arranged on the two opposite side surfaces of the rail web of the steel rail, the two optical fibers arranged at the same side are symmetrically arranged by providing the neutral axis of the steel rail as the symmetry axis, and an included angle of 90 degrees is provided between the two optical fiber sensitive elements.

By adopting the technical scheme, two optical fiber sensitive elements are respectively subjected to tensile and compressive deformation, and the optical fiber sensitive elements can be only sensitive to the shearing force perpendicular to the steel rail and insensitive to other interference factors such as stretching and rebound, so that detection accuracy is further improved.

The invention is further provided as: the pressure detection device comprises an optical fiber sensitive element which is fixed on a rail base slope formed between the rail web and the rail base, with the installation direction parallel to the arrangement direction of the steel rail.

Further, the pressure detection device comprises at least two optical fiber sensitive elements which are respectively fixed on rail base slopes formed between the two opposite side surfaces of the rail web and the rail base, with the arrangement direction parallel to that of the steel rail.

Further, the pressure detection device comprises an elastic plate provided as an elastic carrier, the elastic plate is provided with a cavity, one cavity wall of the cavity is a strain surface, and at least two optical fiber sensitive elements are fixed on the surface of the strain surface.

By adopting the technical scheme, the railway overload and unbalanced load detection equipment not only requires accurate shear force waveform for carrying out vehicle identification, but also requires weighing a passing vehicle to determine load situation of the vehicle or synthesize shear force and pressure into a standard square wave proportional to weight. Therefore, for unified coding during later period building of an railway overload and unbalanced load detection system, the pressure detection device is taken into account in the invention, during later period processing, a complete set of railway overload and unbalanced load detection system can be matched only by unifiedly coding detection signals of the pressure detection device and the shear force detection device.

The invention also provides a railway overload and unbalanced load detection system provided with the optical fiber detection device with the steel rail as the elastomer, further comprising an optical fiber data acquisition device, and the optical fiber sensitive elements are unifiedly numbered, respectively occupy bandwidth and are connected to the optical fiber data acquisition device in a combined mode of serial connection and digital output.

By adopting the technical scheme, the optical fiber sensitive elements are unifiedly numbered, and bandwidth is allocated to the optical fiber sensitive elements, thereby being convenient for reading and storing shear force and pressure data by utilizing a unified optical fiber decoder.

Figure 1:
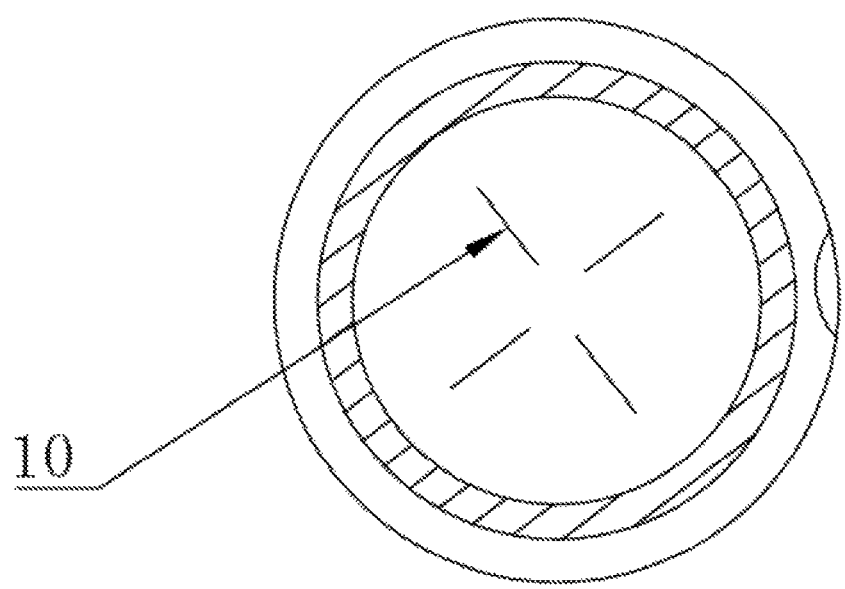
FIG. 1 shows a drawing 1 for a background technology of an optical fiber detection device with a steel rail as an elastomer.
Figure 2:
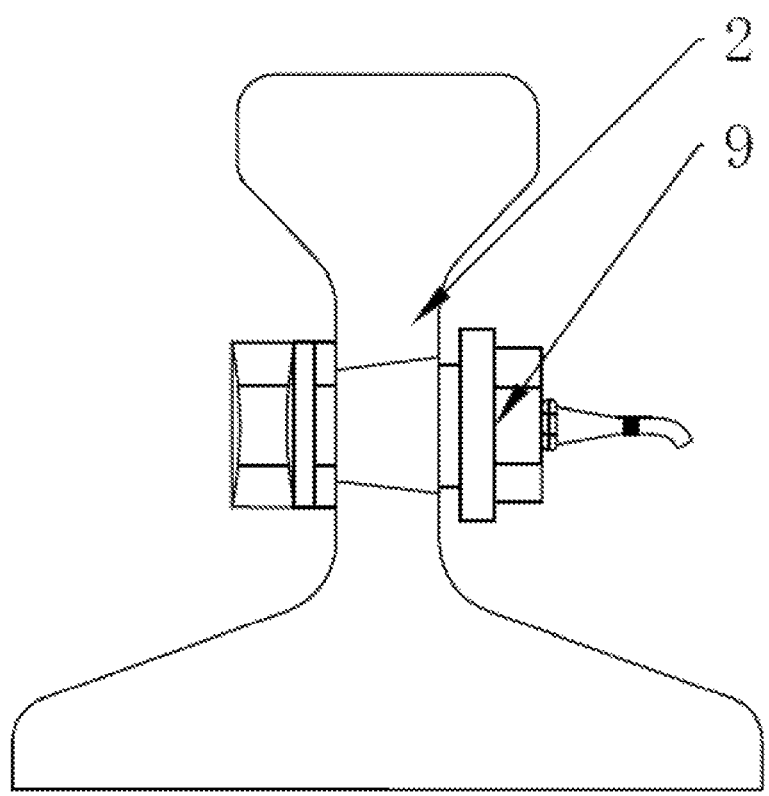
FIG. 2 shows a drawing 2 for the background technology.
Figure 3:
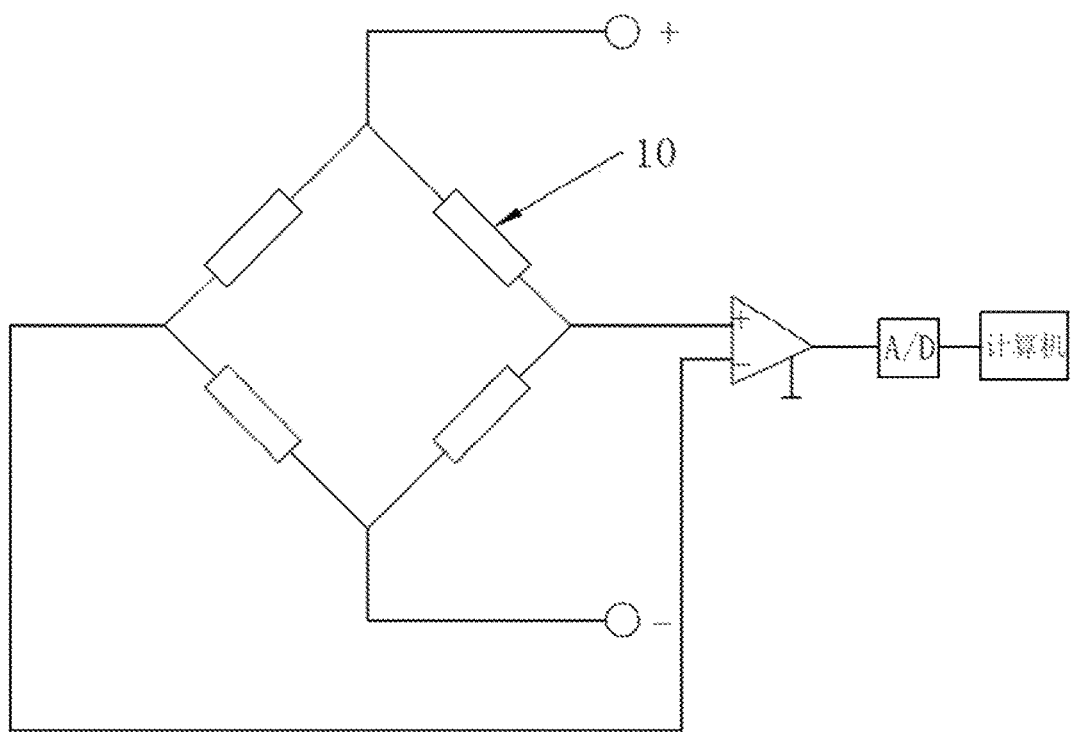
FIG. 3 shows a drawing 3 for the background technology.
Figure 4:
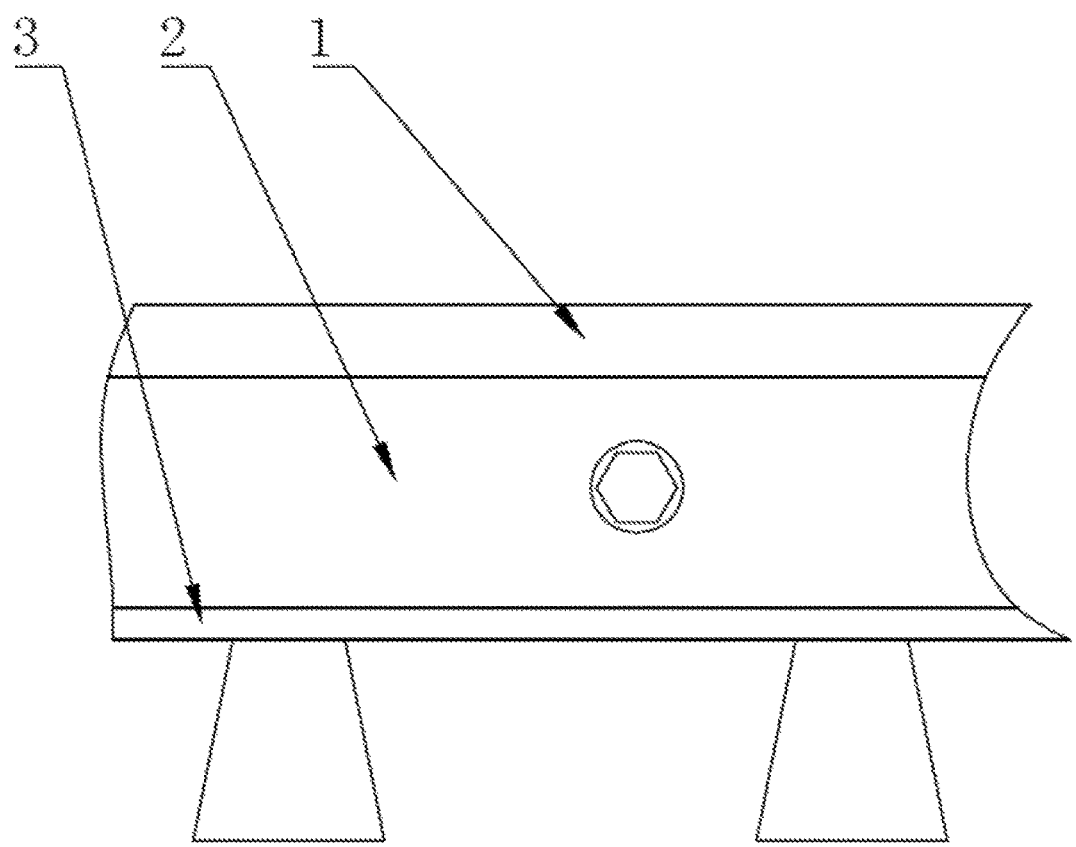
FIG. 4 shows a drawing 4 for the background technology.
Figure 5:
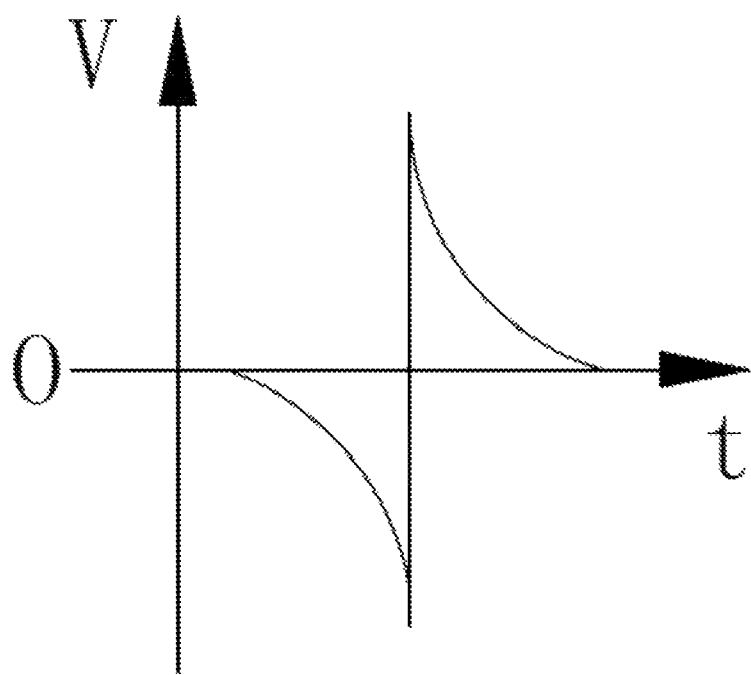
FIG. 5 shows a drawing 5 for the background technology.

Reference numerals: 1 rail head, 2 rail web, 3 rail base, 4 neutral axis, 5 optical fiber sensitive element, 6 elastic plate, 7 strain surface, 8 optical fiber data acquisition device, 9 traditional steel rail shear force sensor, and 10 strain gauge.

DETAILED DESCRIPTION OF PREFERRED EMBODIMENTS

Referring to FIGS. 6 to 21, an embodiment I of an optical fiber detection device with a steel rail as an elastomer is further illustrated.

An optical fiber detection device with the steel rail as the elastomer comprises the steel rail provided as the elastomer and an optical fiber sensitive element 5 provided as a detection element, wherein the steel rail comprises a rail head 1, a rail web 2 and a rail base 3 and is set up on sleepers by virtue of the lower bottom surface of the rail base 3, and an inclined rail base slope is formed between the rail base 3 and the rail web 2. A neutral axis 4 is one position subjected to special stress on the rail web 2. On the horizontal cross section, where the neutral axis 4 is located, of the rail web 2, the steel rail does not bear tensile stress or compressive stress, and the neutral axis 4 is provided as datum during welding of the optical fiber sensitive element 5 in later period.

Embodiment I of Shear Force Detection Device

Figure 6:
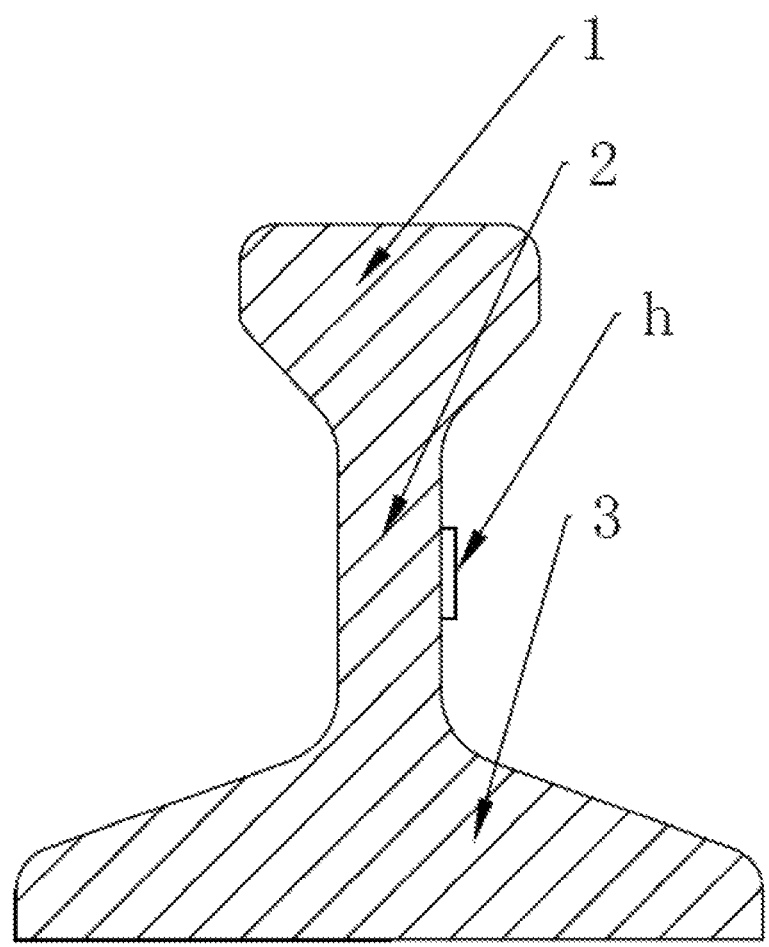
FIG. 6 shows a drawing 1 for an arrangement form of a preferred embodiment I of a shear force detection device.
Figure 7:
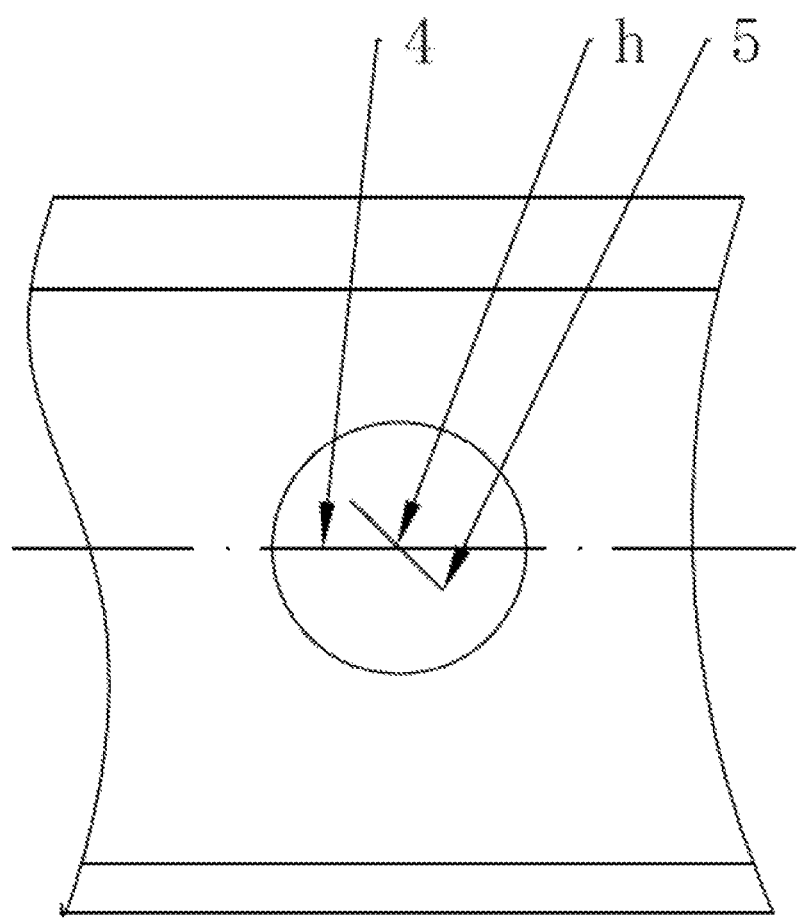
FIG. 7 shows a drawing 1 for an arrangement form of the preferred embodiment I of the shear force detection device.
Figure 8:
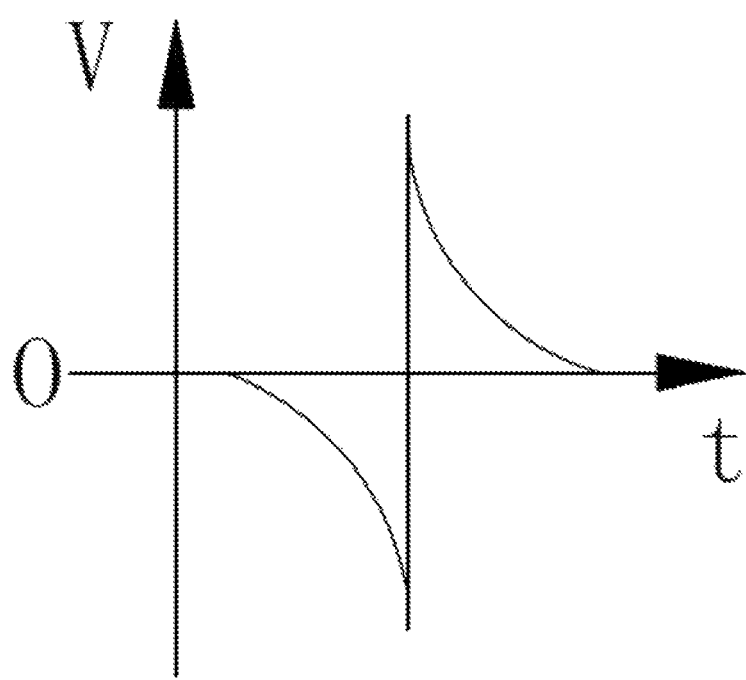
FIG. 8 is a shear force waveform diagram for the arrangement form of the preferred embodiment I of the shear force detection device.

As shown in FIGS. 6 to 8, the shear force detection device comprises one optical fiber sensitive element 5 with the arrangement direction passing through the neutral axis 4 and forming an included angle of 40-50 degrees, preferably 45 degrees, with the neutral axis 4. At the moment, a middle point of the length of the optical fiber sensitive element 5 is located on the neutral axis 4. At the position, the optical fiber sensitive element 5 is least influenced by vibration of the steel rail, and the optical fiber sensitive element 5 between the rail head 1 and the neutral axis 4 can detect deformation, caused by compressive stress, of the steel rail under the action of an external force; the optical fiber sensitive element 5 between the neutral axis 4 and the rail base 3 can detect deformation, caused by tensile stress, of the steel rail under the action of the external force.

A fixing manner of the optical fiber sensitive element 5 and the outer surface of the rail web 2 of the steel rail is low-energy welding, namely a low-energy welding manner is adopted for fixing, and an operation mode thereof comprises: firstly polishing the surface, adjacent to the neutral axis 4, of the steel rail on the rail web 2; fixing the optical fiber sensitive element to the surface of the steel rail by virtue of soldering tin in a frame of a restricting mold, compared with the traditional bonding manner, the fixing manner of the soldering tin can effectively overcome the defects that an adhesive layer deforms when being influenced by temperature or n external force, further stress suffered by the optical fiber sensitive element 5 is influenced and a measurement error of the optical fiber sensitive element 5 is produced.

Embodiment II of Shear Force Detection Device

Figure 9:
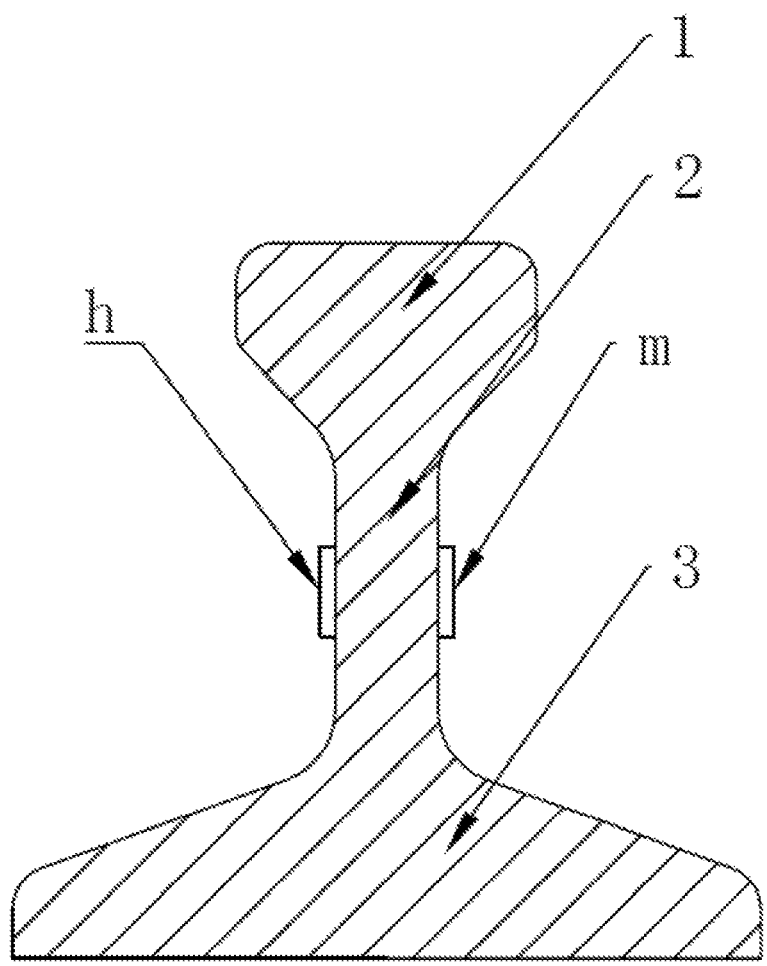
FIG. 9 shows a drawing 1 for an arrangement form of a preferred embodiment II of the shear force detection device.
Figure 10:
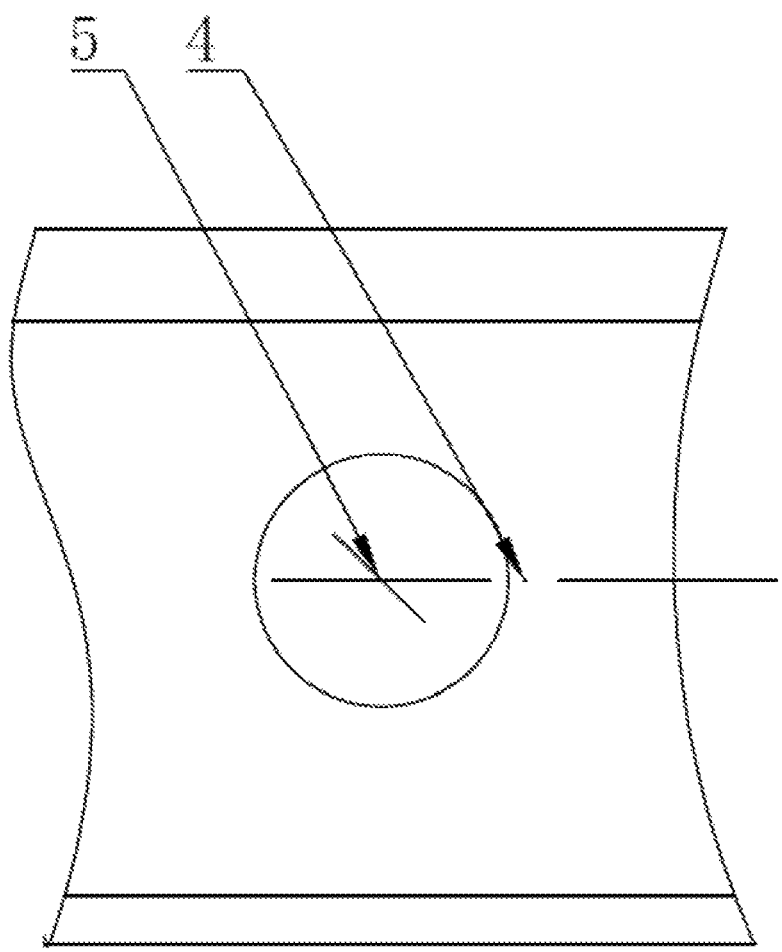
FIG. 10 shows a drawing 2 for an arrangement form of the preferred embodiment II of the shear force detection device.
Figure 11:
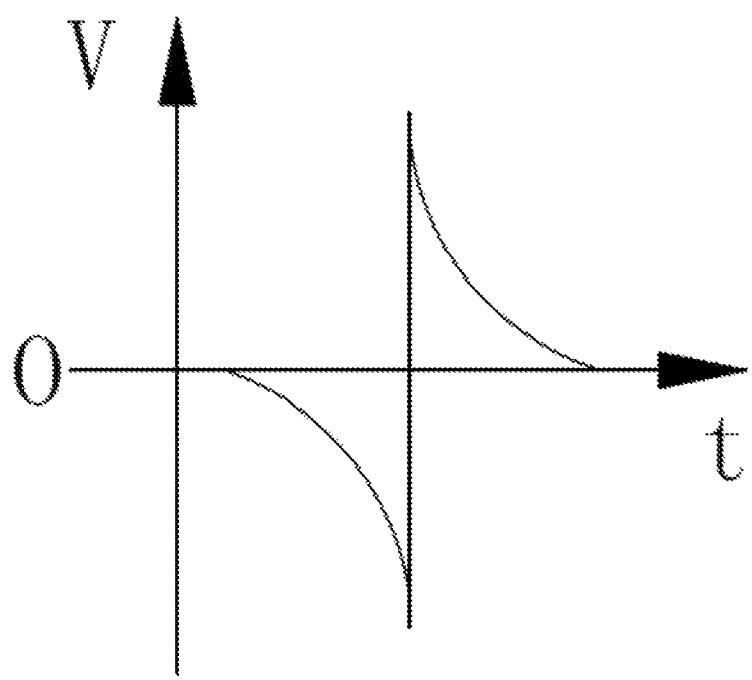
FIG. 11 is a shear force waveform diagram of the arrangement form of the preferred embodiment II of the shear force detection device.

As shown in FIGS. 9 to 11, the shear force detection device comprises two optical fiber sensitive elements 5 the arrangement forms and the fixing manners of which are the same as the embodiment the two optical fiber sensitive elements 5 are respectively pasted on the two opposite side surfaces of the rail web 2 of the steel rail, and the two optical fiber sensitive elements 5 are located at positions equal in height from the rail base when being arranged on the rail web 2. Compared with the arrangement form of a single optical fiber sensitive element in the embodiment I, the two optical fiber sensitive elements 5 are located at the same deformation position of the steel rail, so that influence of deformation, vibration and the like caused by an external force on the two optical fiber sensitive elements 6 is equivalent and opposite, further interference caused by the external force can be mutually offset, at the moment, the position of the neutral axis 4 is also changed accordingly, and the two optical fiber sensitive elements 5 are complementary, thereby guaranteeing that shear force waveform produced is not influenced due to eccentricity of the steel rail under the action of the external force.

Embodiment I of Shear Force Detection Device

Figure 12:
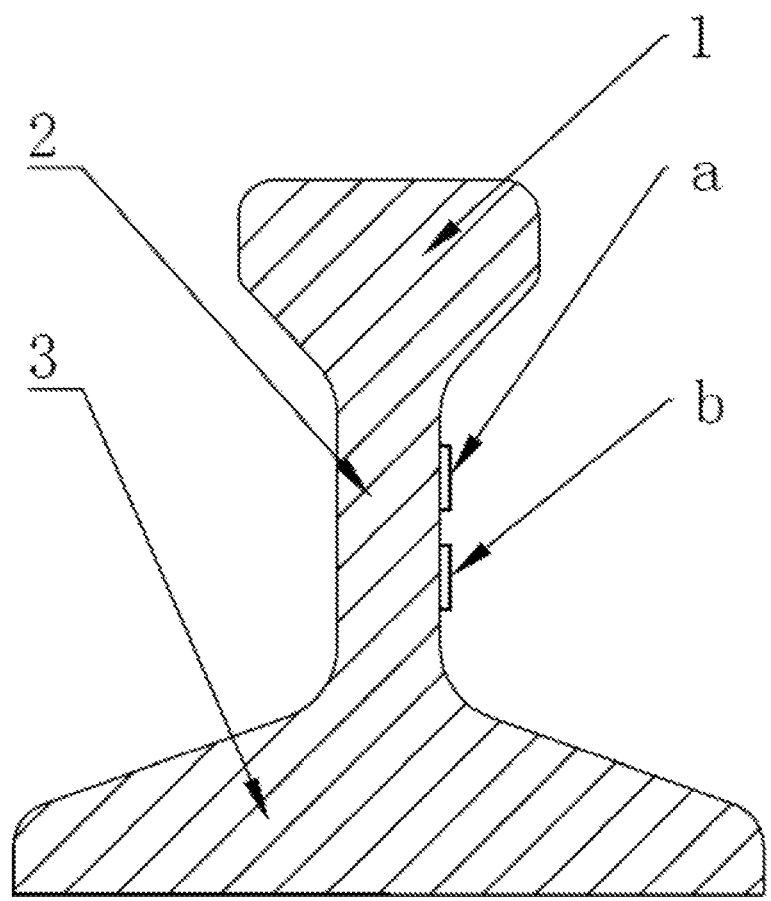
FIG. 12 shows a drawing 1 for an arrangement form of a preferred embodiment III of the shear force detection device.
Figure 13:
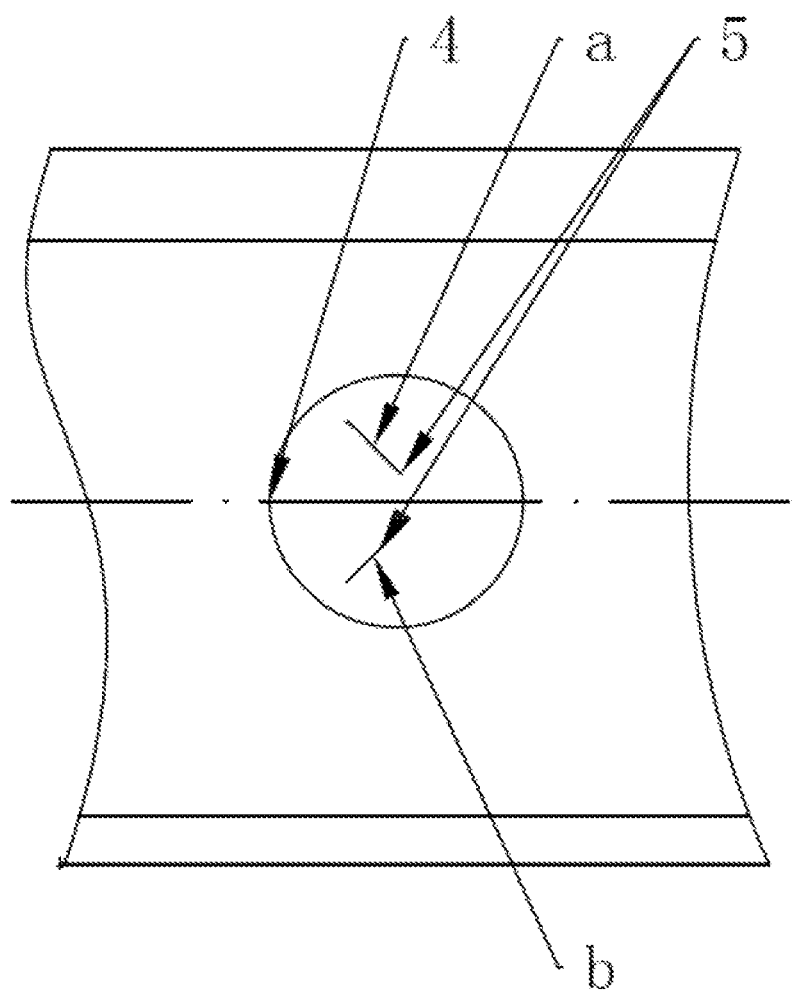
FIG. 13 shows a drawing 2 for an arrangement form of the preferred embodiment III of the shear force detection device.
Figure 14:
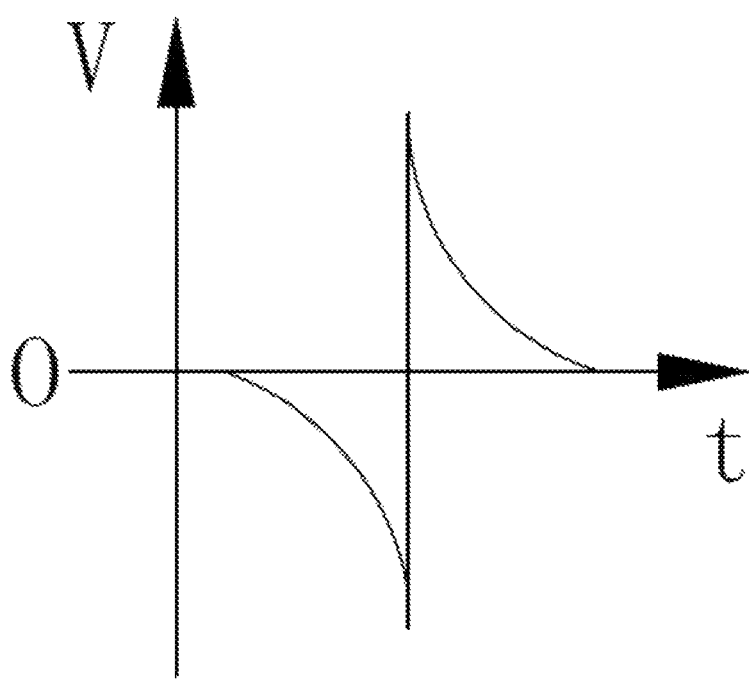
FIG. 14 is a shear force waveform diagram of the arrangement form of the preferred embodiment III of the shear force detection device.

As shown in FIGS. 12 to 14, the neutral axis 4 is provided as a symmetry axis, two optical fiber sensitive elements 5 are arranged on the same side surface of the rail web 2 and the two optical fiber sensitive elements 5 have an included angle of 90 degrees, so that during deformation of the steel rail, in the two optical fiber sensitive elements 5, the optical fiber sensitive element 5 arranged between the rail head 1 and the neutral axis 4 detects shear force waveform produced by tensile deformation of the steel rail, the optical fiber sensitive element 5 arranged between the neutral axis 4 and the rail base 3 detects shear force waveform produced by compressive deformation of the steel rail, thereby preventing one optical fiber sensitive element 5 from bearing the tensile and compressive deformation at the same time and being beneficial to improving quality of the output shear force waveform.

Embodiment IV of Shear Force Detection Device

Figure 15:
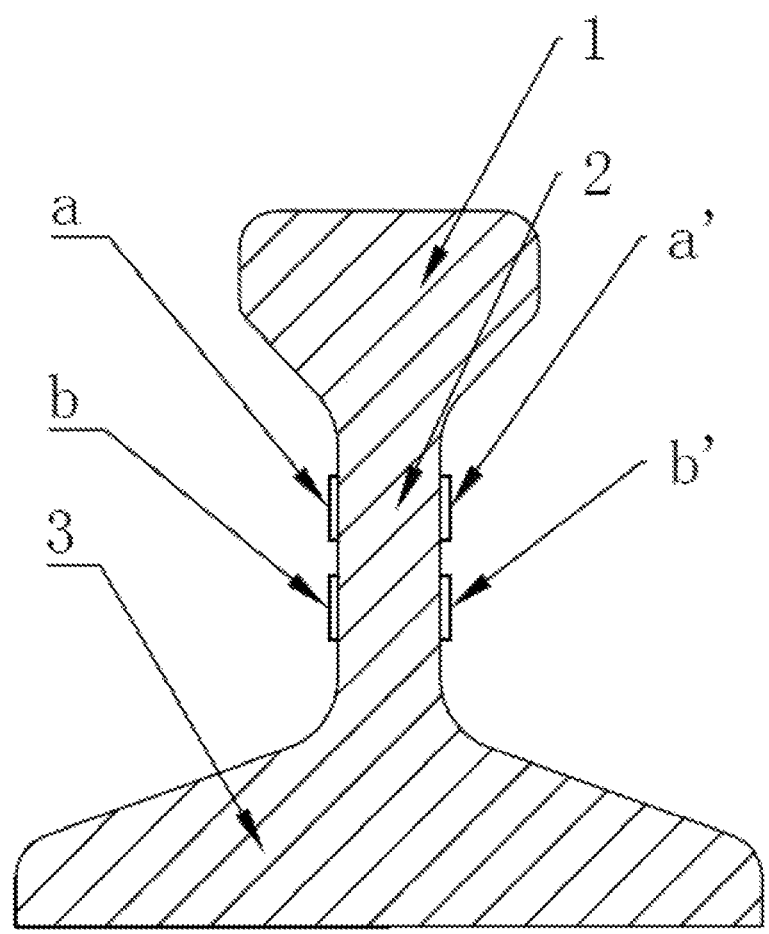
FIG. 15 shows a drawing 1 for an arrangement form of a preferred embodiment IV of the shear force detection device.
Figure 16:
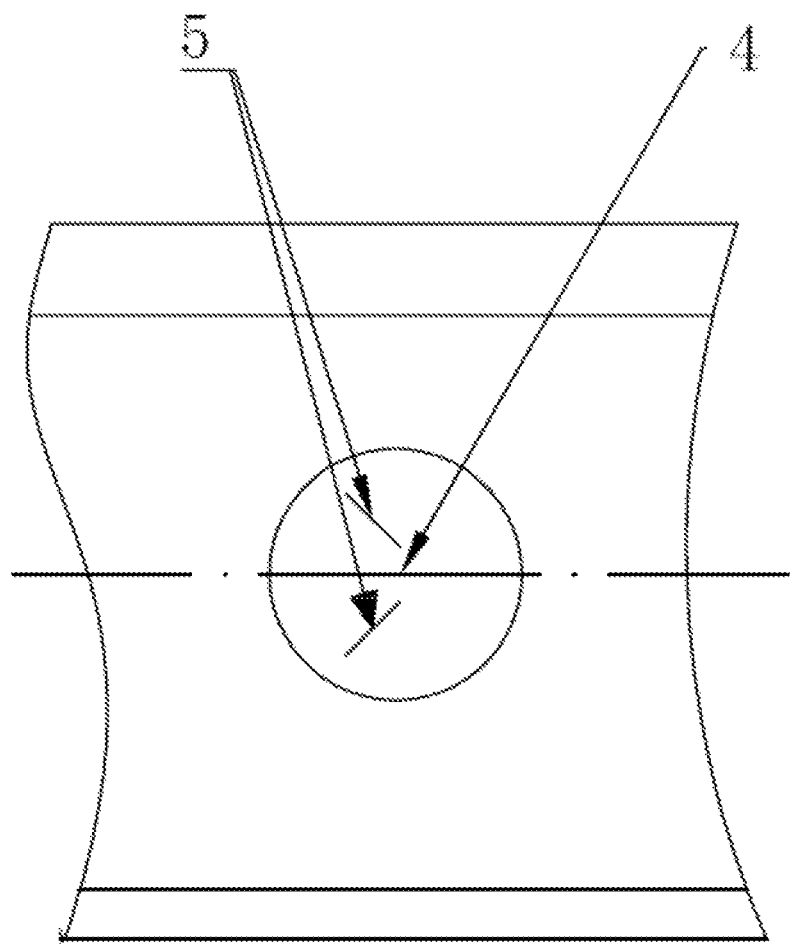
FIG. 16 shows a drawing 2 for an arrangement form of the preferred embodiment IV of the shear force detection device.

As shown in FIGS. 15 and 16, quantity of optical fiber sensitive elements 5 in the embodiment IV is 4, every two optical fiber sensitive elements are in one group, the two groups are respectively arranged on the two side surfaces of the rail web 2 of the steel rail, wherein the arrangement form of each group is in accordance with that of the embodiment III, the arrangement forms of the two groups of optical fiber sensitive elements 5 are completely the same, and distances of the two groups from the rail base 3 are equal, four optical fiber sensitive elements 5 form a complete shear force test point, the two groups can be mutually complementary when gravity centers of the two groups on the steel rail are eccentric, so as to output one complete and stable shear force waveform.

Preferred Embodiment I of Pressure Detection Device

Figure 17:
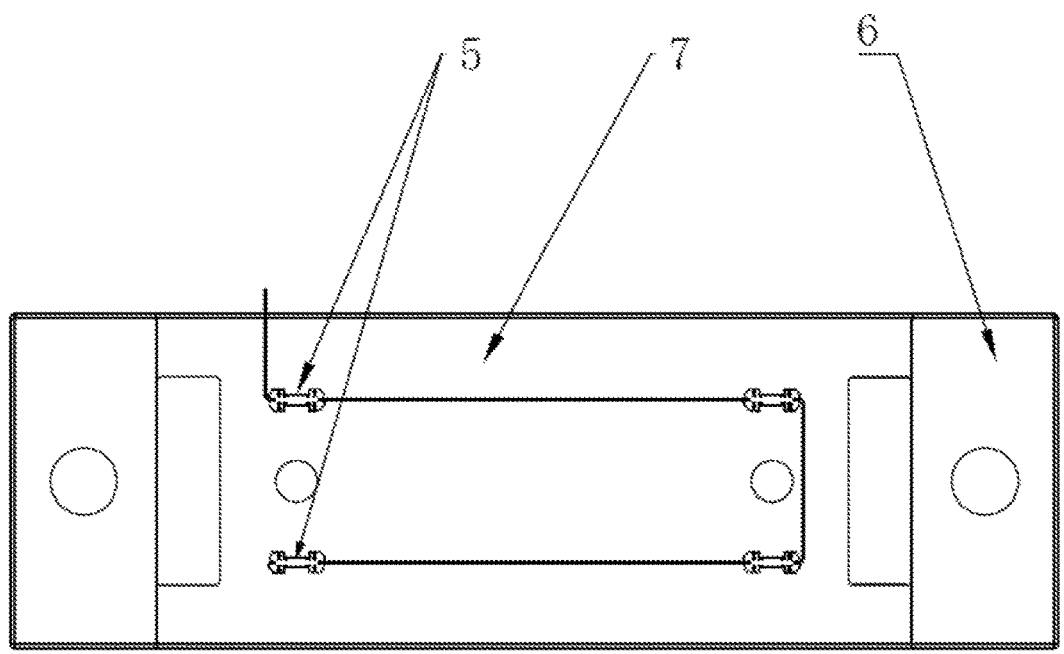
FIG. 17 shows a drawing for an arrangement form of a preferred embodiment I of a pressure detection device.

As shown in FIG. 17, a structural position of an elastic plate 6 is located between the steel rail and sleepers, a cavity is formed in one side surface, at one side of the sleepers, of the elastic plate 6, the bottom of the cavity is provided as rain surface in the embodiment I, and the strain surface and a stress surface f the elastic plate 6 remain parallel. An optical fiber sensitive element 5 is arranged on the surface of the strain surface. Then the strain surface of the elastic plate 6 bears a load, after the whole elastic plate 6 produces deformation, the optical fiber sensitive element 5 fixed on the strain surface also can produce adaptive deformation, and further wavelength of light output by the optical fiber sensitive element 5 is influenced.

Preferred Embodiment II of Pressure Detection Device

Figure 18:
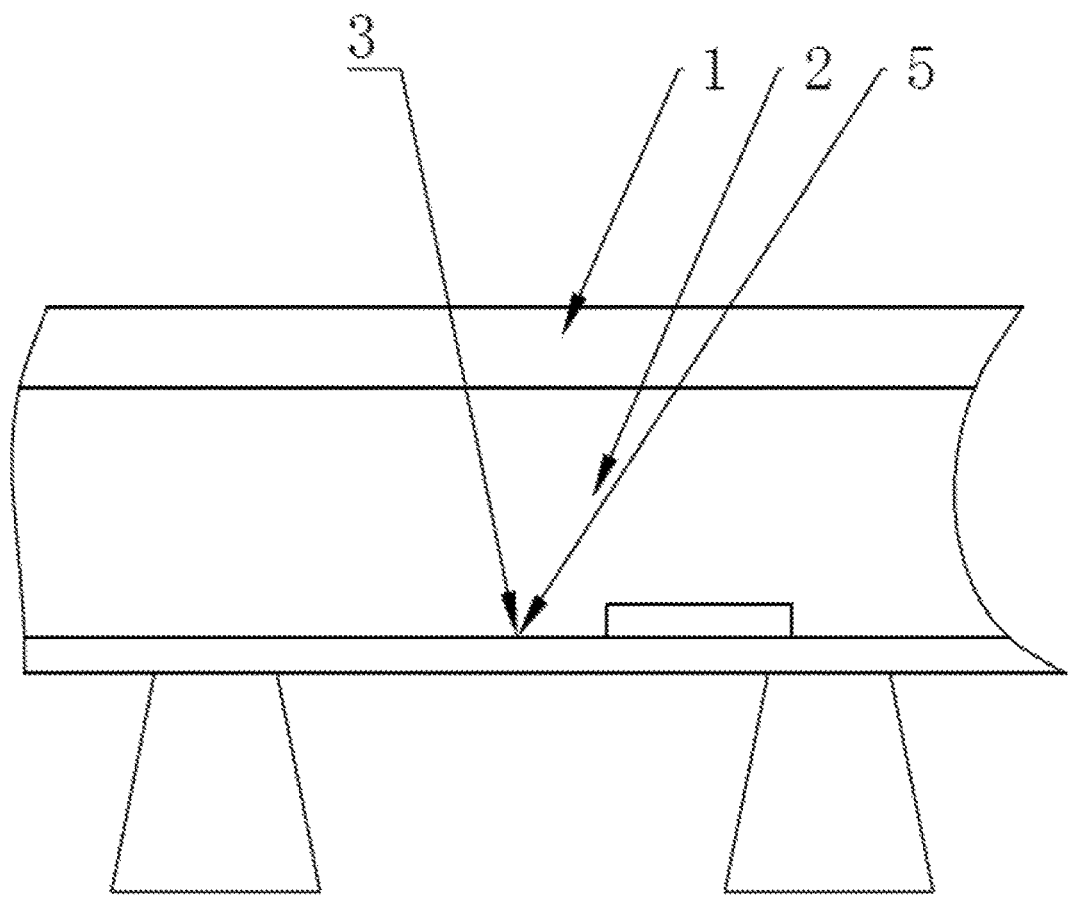
FIG. 18 shows a drawing 1 for an arrangement form of a preferred embodiment II of the pressure detection device.
Figure 19:
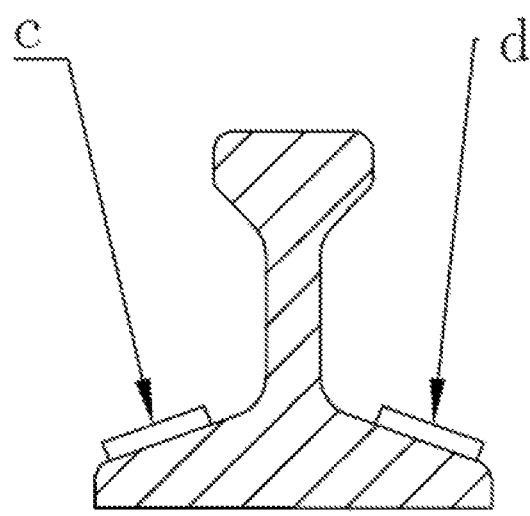
FIG. 19 shows a drawing for an arrangement form of the preferred embodiment II of the pressure detection device.
Figure 20:
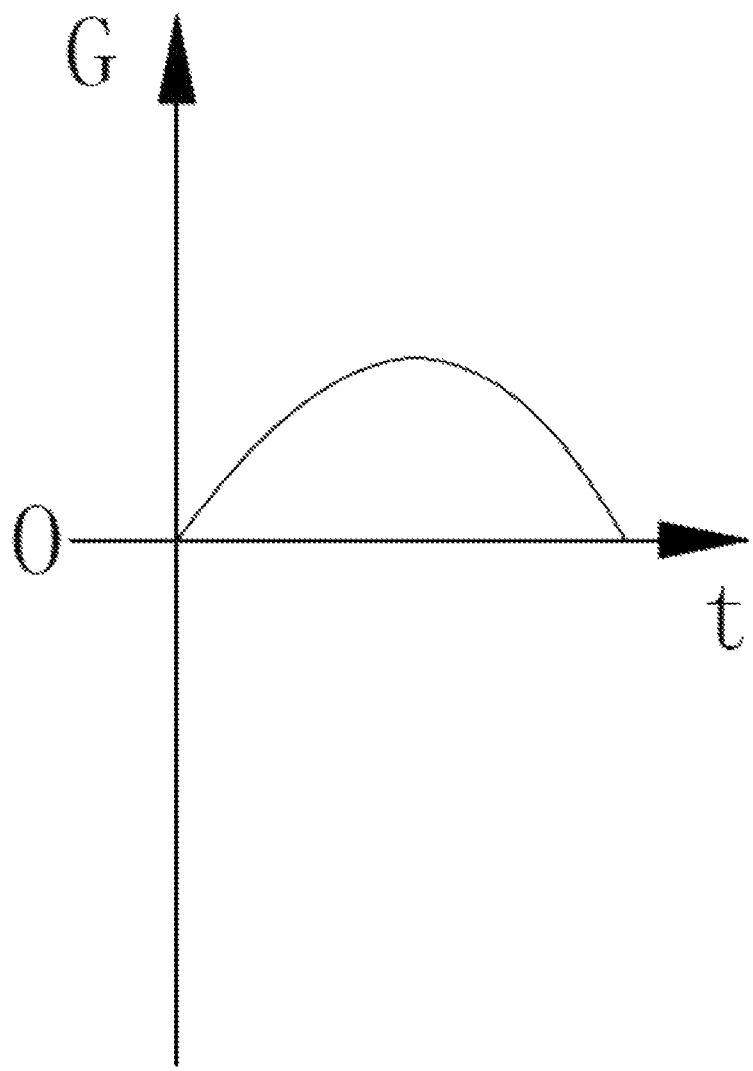
FIG. 20 is a waveform diagram obtained by the pressure detection device.

As shown in FIGS. 18 to 20, like the shear force detection device, in the embodiment II, two optical fiber sensitive elements 5 are welded on a rail base slope formed between a rail base 3 and a rail web 2 through low-energy welding, and the extension direction of the optical fiber sensitive element 5 inconsistent with that of the steel rail. Pressure waveform obtained by a preferred embodiment II of the pressure detection device is shown in FIG. 9.

Figure 21:
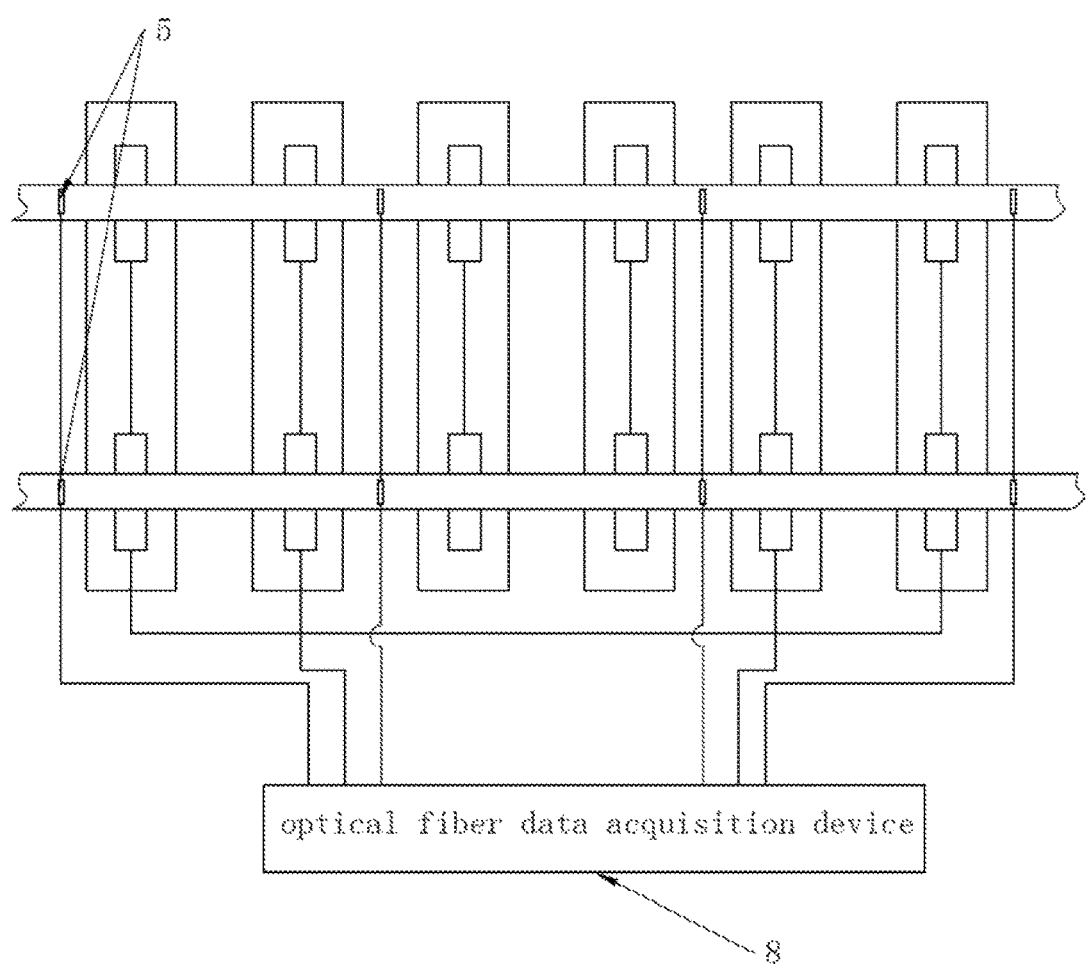
FIG. 21 is a system schematic diagram of a railway overload and unbalanced load detection system.

As shown in FIG. 21, a railway overload and unbalanced load detection system applied to overload and unbalanced load detection of a railway wagon comprises a railway overload and unbalanced load detection system composed of the preferred embodiment I of the pressure detection device and any one of the preferred embodiments I to IV of the shear force detection device, also comprises an optical fiber data acquisition device 8, a plurality of pressure detection devices and shear force devices are arranged at equal distances along laying direction of a track, wherein a first shear force detection device on the track and pressure detection device serve as an initiating device of the whole system, when a train passes through a metering section composed of multiple optical fiber sensors, a sensor assembly outputs data flow proportional to vehicle weight along with timing relationship, and mathematical analysis and processing are carried out on the data flow by virtue of a computer. If the first shear force detection device is damaged, the other two shear force detection devices can still work independently, then only the metering section is shortened, the detection accuracy is slightly influenced, but equipment can still continue working, and the dynamic test can be realized in the arrangement form. It should be pointed out that the pressure detection devices of the railway overload and unbalanced load detection system in the embodiment II adopt a plate type sensor in an invention patent developed by the company before with an application number of 2015103868152, under the condition that multiple shear force sensors exist in the system, the shear force sensors are matched with the plate type sensors, the optical fiber sensitive elements are unifiedly numbered, and bandwidth is allocated to the optical fiber sensitive elements.

Experiment Verification Part

A railway line scene is simulated, and experiment verification is carried out on technical schemes of the preferred embodiments II to IV of the shear force detection device, comprising: supporting an experiment steel rail under the steel rail by virtue of simulated sleepers at intervals of 600 mm; then pressurizing at left and right fulcrums respectively, respectively pressurizing at positions 200 mm away from the left and right fulcrums, and then respectively pressurizing at slightly deviated places near an approximate central line (300 mm away from the fulcrums) of the left and right fulcrums. Experiment results are as follows:

1. When pressurizing at the left and right fulcrums, outputs of the optical fiber sensitive elements are unchanged as the steel rail does not deform.

2. When pressurizing at a position 200 mm away from the left fulcrum, an optical fiber sensitive element a outputs positive deviance, and an optical fiber sensitive b outputs negative deviance; when pressurizing at a position 200 mm away from the right fulcrum, the optical fiber sensitive element a outputs negative deviance, and the optical fiber sensitive b outputs positive deviance; outputs of optical fiber sensitive elements c and d are positive respectively.

3. When pressurizing at a position slightly moved left from the middle of the big right fulcrum, the optical fiber sensitive element a outputs positive deviance, and the optical fiber sensitive element b outputs negative deviance; when pressurizing at a position slightly moved right from the middle of the left fulcrum, the optical fiber sensitive element a outputs negative deviance, the optical fiber sensitive element b outputs positive deviance, and the output deviance amounts are respectively larger than those at the position 200 mm away from the fulcrums, since deformation of the steel rail is proportional to moments of stress points from the fulcrums; the outputs of the optical fiber sensitive elements c and d are respectively positive, and output values are respectively larger than those at the positions 200 mm away from the fulcrums.

4. The outputs at all the pressurized points of optical fibers a and b are connected into a curve, and conclusions obtained through measurement and calculation are as follows: firstly the output is proportional to stress and inversely proportional to distances from the middles of the fulcrums, the curve jumps with the middle point of the fulcrums as delimitation; the waveform thereof is the same as the traditional steel rail shear force sensor, the traditional strain gauge steel rail shear force sensor can be replaced, but full scale output value is smaller than that of the plate type sensor, being about ¼-½ according to different quantities of optical fiber sensors assembled in the plate type sensor, but stability of the output value is good.

5. Outputs of the optical fiber sensitive elements c and d are inversely proportional to the load and proportional to distances from the fulcrums.

Outputs of optical fibers a, b, c, d, m, n in dynamic test on a moving train conforms to rules of static test, especially, outputs of a and a', b and b', m and n are complementary, which correct interference factors in a measuring process.

The above is only the preferred embodiments of the invention, protection scope of the invention is not only limited to the embodiments described above, all the technical schemes within the spirit of the invention fall within the protection scope of the invention. It should be pointed that, for those ordinary skilled in the art, improvements and modifications without departing from principles of the invention shall be considered within the protection scope of the invention.

We claim:

1. An optical fiber detection device with a steel rail as an elastomer, comprising a shear force detection device and a pressure detection device, wherein the shear force detection device comprises an optical fiber sensitive element which is fixed on a rail web of the steel rail and passes through a neutral axis of the steel rail;

the shear force detection device internally comprises four optical fiber sensitive elements which are grouped in pairs and oppositely arranged on the two opposite side surfaces of the rail web of the steel rail, and the two optical fibers arranged at the e side are symmetrically arranged by providing the neutral axis of the steel rail as the symmetry axis, the two optical fiber sensitive elements have the included angle of 90 degrees.

2. The optical fiber detection device with the steel rail as the elastomer according to claim 1, wherein the pressure detection device comprises an optical fiber sensitive element which is fixed on a rail base slope formed between the rail web and the rail base, with the installation direction parallel to the arrangement direction of the steel rail.

3. The optical fiber detection device with the steel rail as the elastomer according to claim 2, wherein the pressure detection device comprises at least two optical fiber sensitive elements which are respectively fixed on rail base slopes formed between the two opposite side surfaces of the rail web and the rail base, with the arrangement direction parallel to that of the steel rail.

4. The optical fiber detection device with the steel rail as the elastomer according to claim 1, wherein the pressure detection device comprises an elastic plate provided as an elastic carrier, the elastic plate is provided with a cavity, one cavity wall of the cavity is a strain surface, and at least two optical fiber sensitive elements are fixed on the surface of the strain surface.

5. A railway overload and unbalanced load detection system provided with the optical fiber detection device with the steel rail as the elastomer according to claim 1, wherein the system also comprises an optical fiber data acquisition device, and the optical fiber sensitive elements are unifiedly numbered, respectively occupy bandwidth and are connected to the optical fiber data acquisition device in a combined mode of serial connection and digital output.

* * * * *